(12) United States Patent
Kuwabara et al.

(10) Patent No.: US 6,250,887 B1
(45) Date of Patent: Jun. 26, 2001

(54) REVERSIBLE PUMP-TURBINE SYSTEM

(75) Inventors: Takao Kuwabara, Hitachi; Masataka Harada, Tokyo, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/214,866

(22) PCT Filed: Jul. 19, 1996

(86) PCT No.: PCT/JP96/02021

§ 371 Date: Jan. 14, 1999

§ 102(e) Date: Jan. 14, 1999

(87) PCT Pub. No.: WO98/03792

PCT Pub. Date: Jan. 29, 1998

(51) Int. Cl.$^7$ ................................ F04B 49/00
(52) U.S. Cl. ............................... 417/26; 415/26
(58) Field of Search ........................ 417/26, 27, 42, 417/43; 415/1, 2, 13, 20, 26, 43, 48

(56) References Cited

U.S. PATENT DOCUMENTS 6,042,331 * 3/2000 Kuwabara ................. 415/36

FOREIGN PATENT DOCUMENTS 61-47981    3/1986   (JP).

* cited by examiner

*Primary Examiner*—Teresa Walberg
*Assistant Examiner*—Thor Campbell
(74) *Attorney, Agent, or Firm*—Mattingly, Stanger & Malur (57) ABSTRACT

A reversible pump-turbine system having a discharge adjustment device such as guide vanes, which make it possible to safely stop a pump turbine at the time of emergency shutdown in a generating mode by performing a close operation using an inlet valve even if abnormality has occurred with the guide vanes, without causing abnormal water hammer. Also, at the time of pump mode emergency shutdown, reverse rotation can be prevented even if abnormality occurs in the guide vanes, and it is possible to achieve a safe stop while reducing the loads/stresses to the reversible pump-turbine.

18 Claims, 10 Drawing Sheets

FIG.1(a)

GENERATING MODE : EMERGENCY SHUT DOWN

FIG.1(b)

PUMPING MODE : EMERGENCY SHUTDOWN

REVERSIBLE PUMP-TURBINE SYSTEM

TECHNICAL FIELD

This invention relates to a reversible pump-turbine system provided with a water amount adjustment device, such as guide vanes, and particularly to a reversible pump-turbine provided with an inlet valve.

BACKGROUND ART

Figure 5:
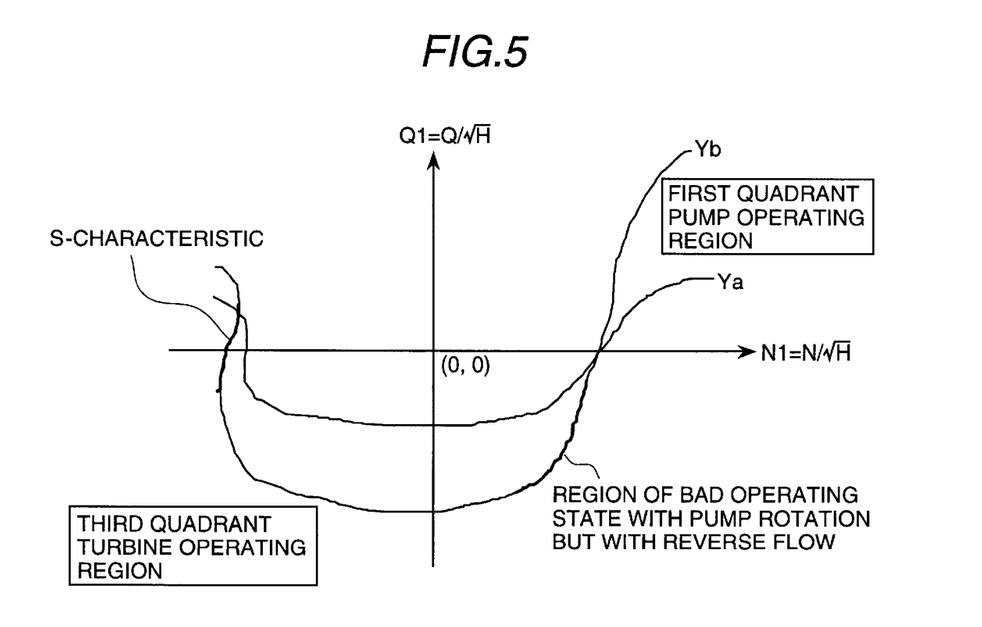
FIG. 5 is a drawing showing a four quadrant N1–Q1 characteristic of a reversible pump-turbine.
Figure 6A:
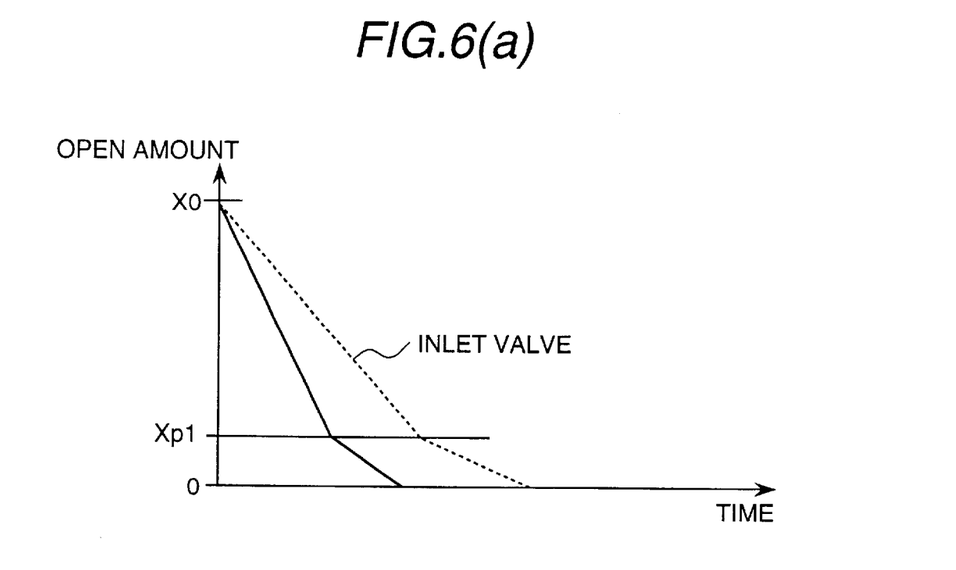
FIGS. 6(a) and 6(b) are drawings showing the relationship between inlet valve closure rate and rotation speed lowering amount in the case where guide vane closure has become impossible at the time of pumping mode emergency shutdown in the related art.
Figure 6B:
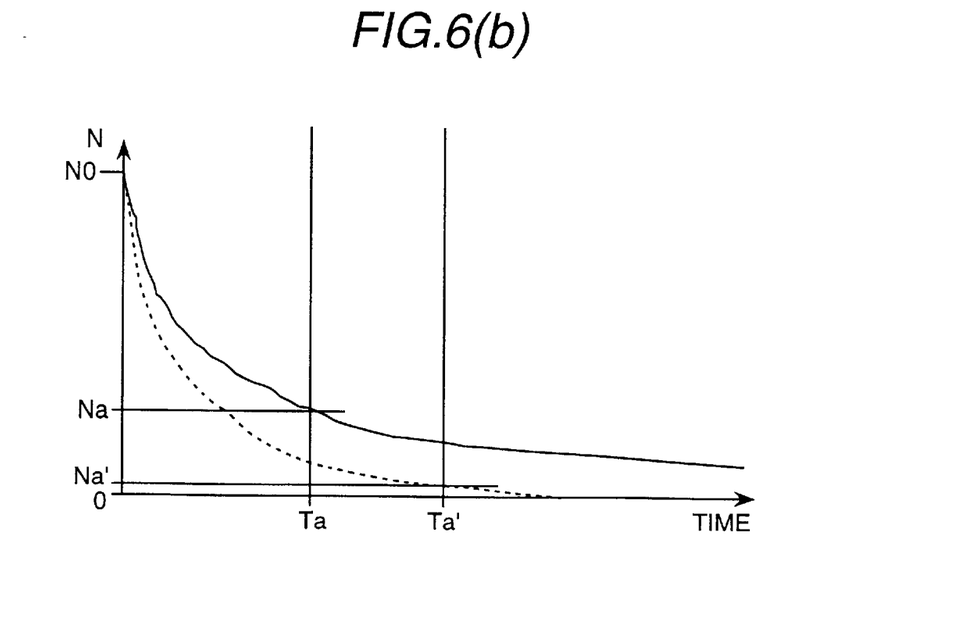
Figure 7:
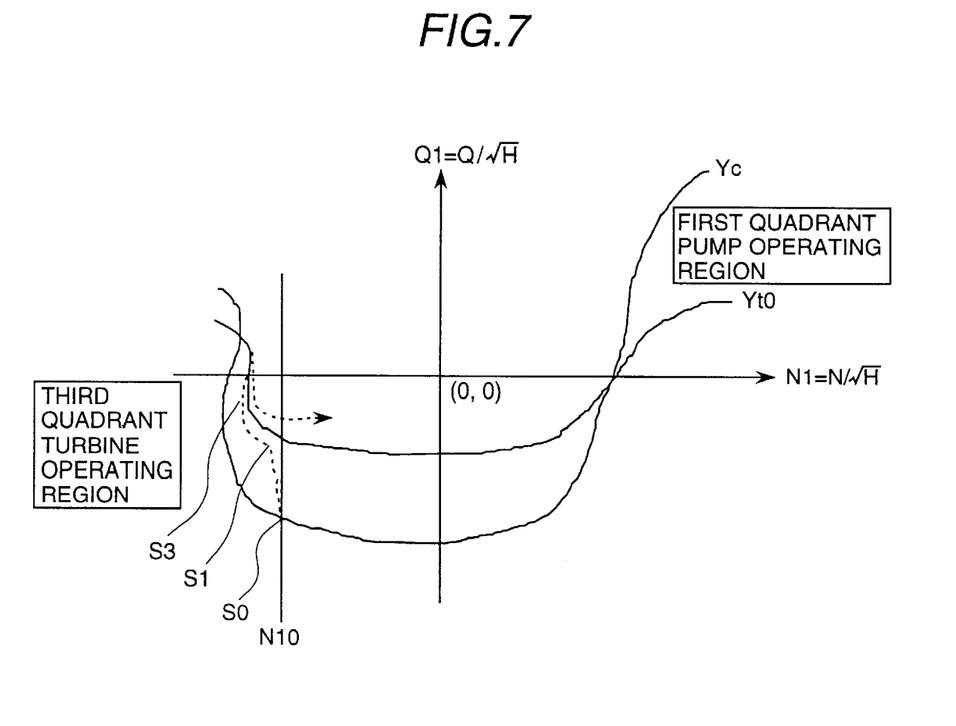
FIG. 7 is a drawing showing a trajectory of operation point of a pump turbine at the time of generating mode emergency shutdown.
Figure 11A:
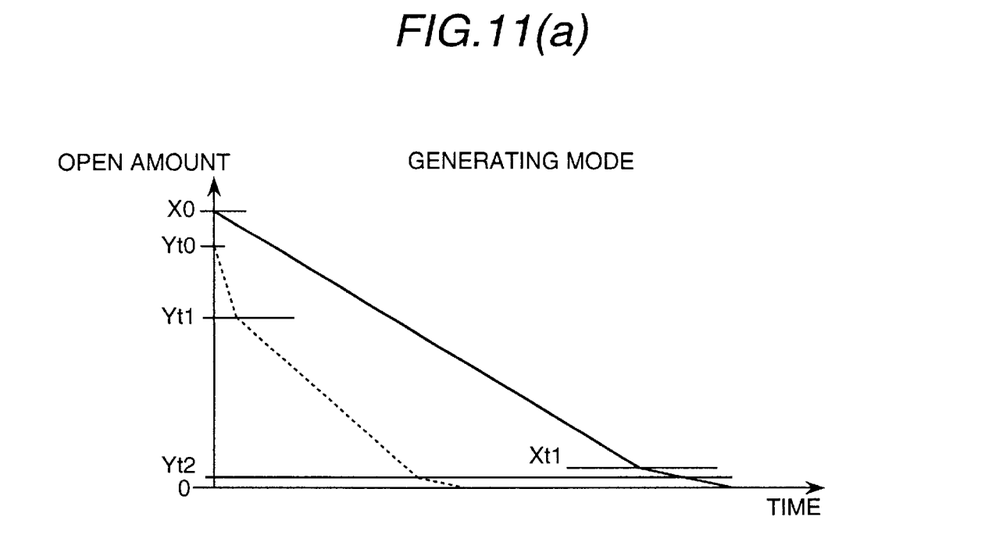
FIGS. 11(a) and (b) are drawings showing a pattern of guide vanes caused to close down.
Figure 11B:
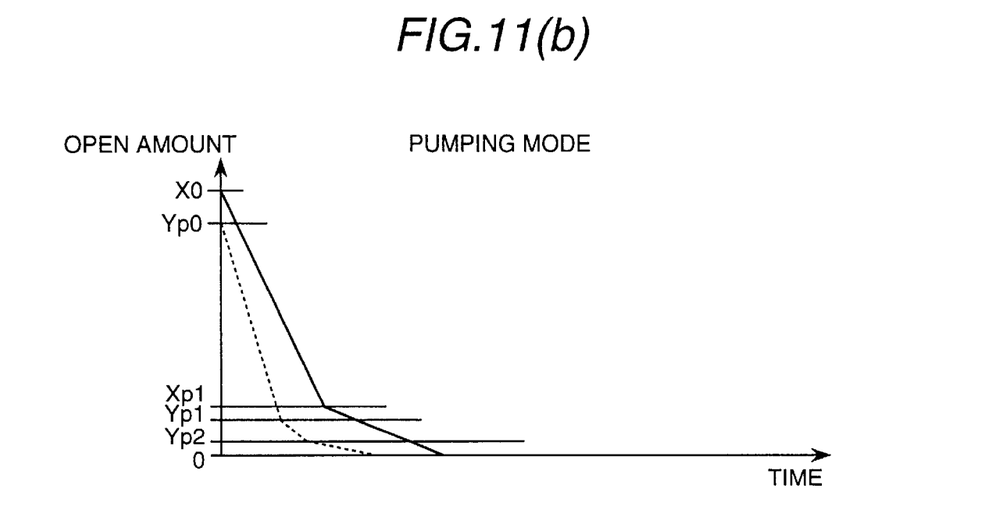

In a conventional reversible pump-turbine, guide vanes are caused to close down with a pattern as shown by the dotted lines in FIGS. 11 (a) and (b) the time of generation mode emergency shutdown and pump mode emergency shutdown. Description will first be given for generation mode emergency shutdown. In this situation, the guide vanes are suddenly closed at the same time as a circuit breaker of an electrical generator is opened. When the initial open amount is Yt0, the guide vanes are closed to open amount Yt1 at a first restricted rate (rapid closure rate) previously set for use in the generation mode that has been, as shown by the dotted lines in FIG. 11(a) and from that point it is automatically switched to a second previously set restricted rate (closure rate after change) for use in the generation mode, and after that the guide vanes are closed at that rate. These first and second restricted rates are rendered by restricting an amount of passing oil in a control valve for a guide vane servo motor driving the guide vanes. If the opening amount becomes less than Yt2, a fully closed end cushion of the guide vane servo motor is actuated, which causes the closure rate to be lowered even further, as shown by the dotted lines in FIG. 11(a). The reason for automatically switching from the first restricted rate (rapid closure rate) to the second restricted rate (closure rate after change) in this way with the opening amount at Yt1 is described in detail in Japanese Patent Laid-open Publication No. Sho. 61-47981, etc., by the inventor of this invention. That is, as a result of raising and lowering the unit speed Ni after the circuit breaker is opened, the operating point trajectory of the pump turbine breaks into S0 to S1 and S1 to S3, the latter moving in a S0-called S shaped characteristic(s) of the pump turbine, as shown by the dotted line in FIG. 7, and because tracing of the S-shaped characteristics in a direction of reduced discharge is commenced there is a need to switch the guide vanes to a slow closure rate before the commencement. What is meant by the S-shaped characteristic here is the portion of dQ1/dN1>0 as shown in FIG. 5.

Figure 3A:
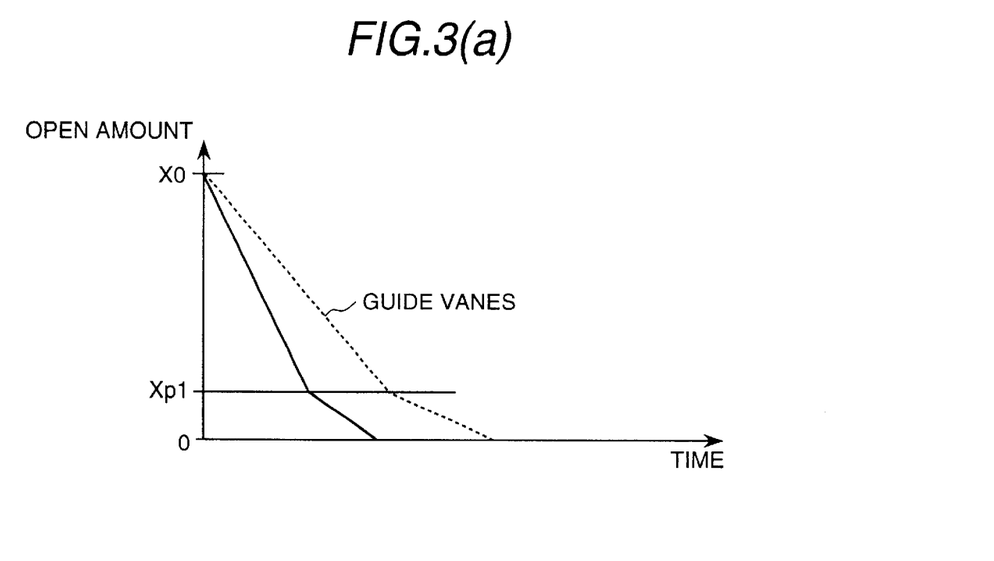
FIGS. 3(a) and 3(b) are drawings showing the relationship between guide vane/inlet valve closure rate and rotation speed lowering amount in the case of pumping mode emergency shutdown.
Figure 3B:
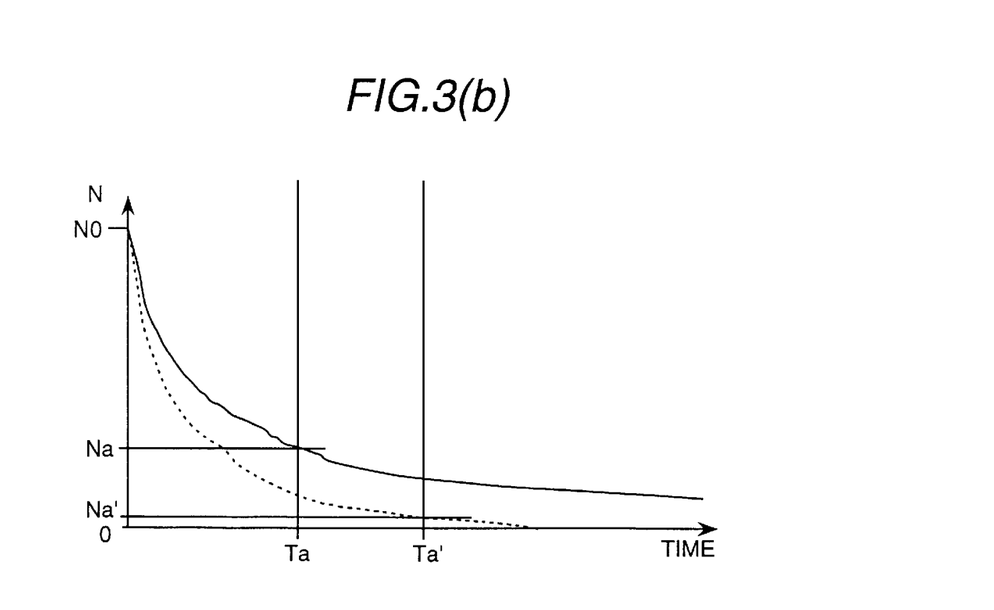
Figure 4:
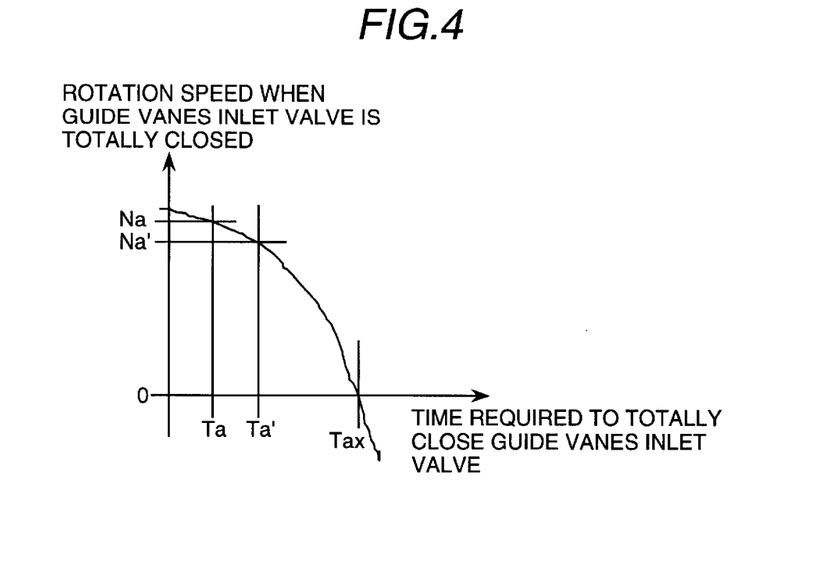
FIG. 4 is a drawing showing the relationship between time required for guide vane/inlet valve closure and rotation speed lowering amount in the case of pumping mode emergency shutdown.

Next, emergency shutdown in a pumping mode will be described. The guide vanes are also closed rapidly at the same time as the circuitbreaker is opened. One criteria for determining the guide vane closure pattern in this case will be described using FIG. 3. In the case where the guide vanes are closed rapidly, as shown by the solid lines in FIG. 3(b) the rotation speed is Na when the guide vanes become fully closed, while the rotation speed falls to Na' at the time of fully closed when the guide vanes is closed slowly, as shown by dotted lines in FIG. 3(b). FIG. 4 shows the relationship between time required for guide vanes to be fully closed and the rotation speed when the guide vanes are fully closed. As will be understood better from FIG. 4, if the time required to fully close the guide vanes becomes a long time, that is if the closure rate of the guide vanes is slow, Na' no longer has a positive value but has a minus value. What this actually means is that reverse rotation may arise in the pump mode. This reverse rotation is extremely damaging due to wear on a thrust bearing.

Figure 8A:
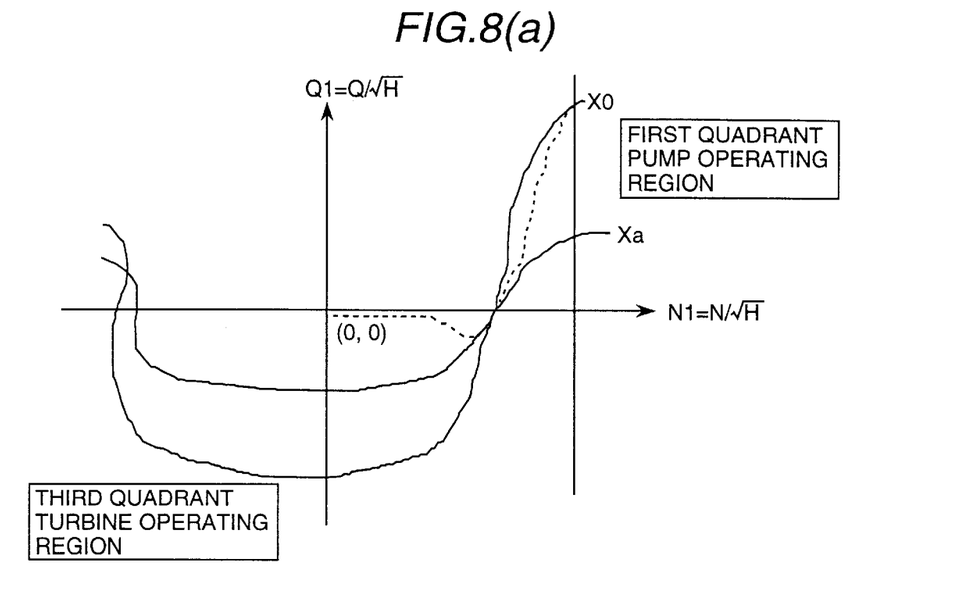
FIGS. 8(a) and 8(b) are drawings showing a trajectory of operation point at the time of pumping mode emergency shutdown.
Figure 8B:
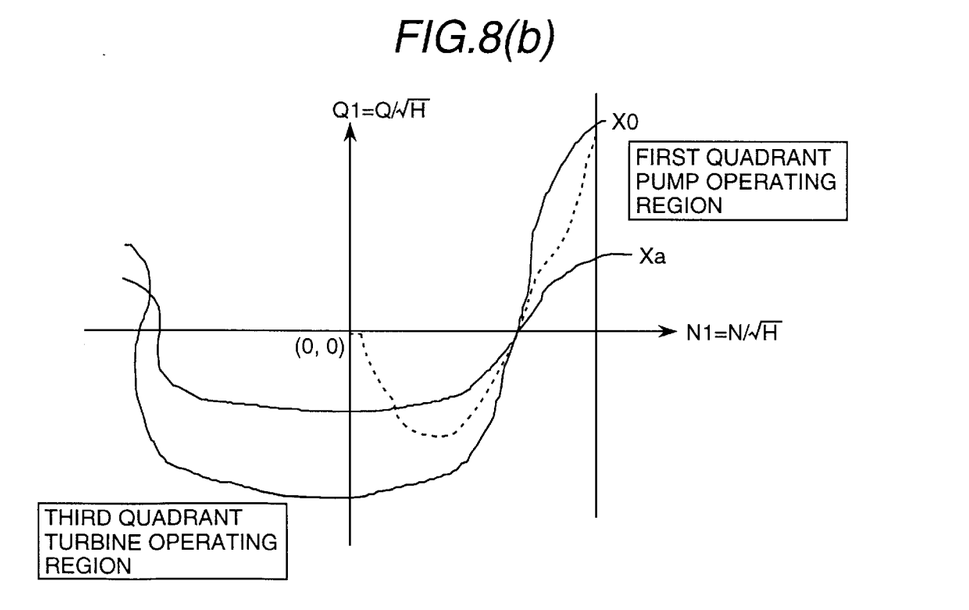

Another criterion determining a guide vane closure pattern at the time of emergency shutdown in the pump mode will be described using FIGS. 8(a) and 8(b).

This description will be given with X0 and Xa as guide vane opening amounts, X0>Xa. A trajectory of the operating point when the guide vanes are closed rapidly is shown by the dotted line in FIG. 8(a). By way of comparison, the case when the guide vanes are closed slowly is shown by the dotted line in FIG. 8(b). Reverse discharge, that is, reverse flow, arises when rotation speed is positive, namely during pump rotation. Even though a reversible pump-turbine has pump rotation, the operating condition becomes to allow turbine flow as accompanied with oscillations and noises. The problem is here that if the guide vane opening amount is too large when reverse flow appears, the operating conditions become bad. Depending on the situation, the reversible pump-turbine can also become damaged. Even further a worse condition than in FIG. 8(b) is possible. If the guide vanes are closed more slowly reverse rotation also will occur even in the pump mode. The guide vanes will be fully closed before long no matter how slowly the guide vanes are closed, and so the operating points finally converge at (0, 0).

The guide vane closure pattern for pumping mode emergency shutdown as described above is determined not to allow reverse rotation, and so determined that reverse flow is suppressed to the minimum.

Figure 9A:
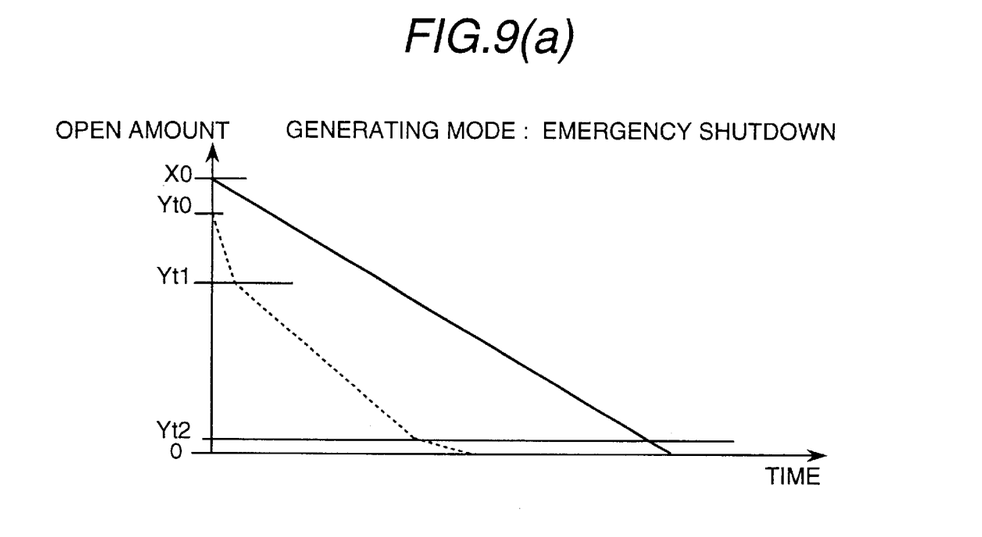
FIGS. 9(a) and 9(b) are drawings showing an inlet valve closure method of the related art.
Figure 9B:
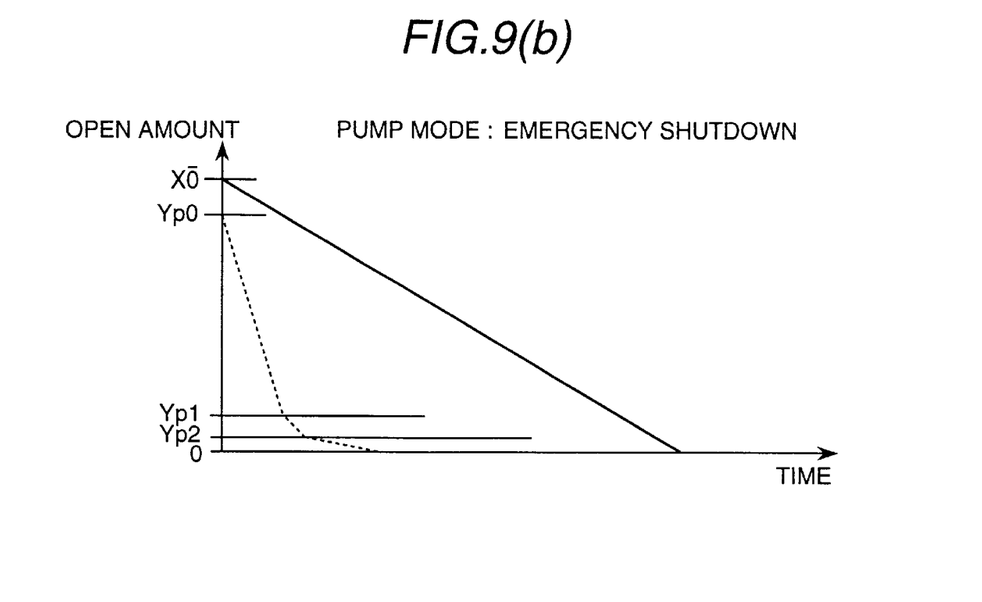

The above describes conventional technology relating to guide vane closure patterns, and on the other hand conventional technology relating to inlet valve closure patterns is shown in FIGS. 9(a) and 9(b). That is, with respect to an inlet valve, the maximum closure rate is determined as a rate close to the second control rate and lower than the first control rate for the guide vanes at the time of emergency shutdown in the generating mode, and this rate is used for both the generating mode and the pumping mode. That is, the rate at the time of generating mode emergency shutdown and the rate at the time of pumping mode emergency shutdown are made the same. Strictly speaking, the load torque acting on the inlet valve is different in the generating mode emergency shutdown and the pumping mode emergency shutdown, which means that, even if the inlet valve closing rate is set to the same rate at the time of a dry test, there are slight differences when the inlet valve is operated in water, but these can be ignored. A reversible pump-turbine that is the subject of the present invention generally carries out flow amount adjustment using the guide vanes, and so does not cover the case where usual discharge adjustment at the time of start-up etc. is carried out using an inlet valve. An inlet valve is considered which is to be opened prior to opening the guide vanes and to be closed after closing the guide vanes, and used in maintenance and inspection operations of the reversible pump-turbine.

Figure 2A:
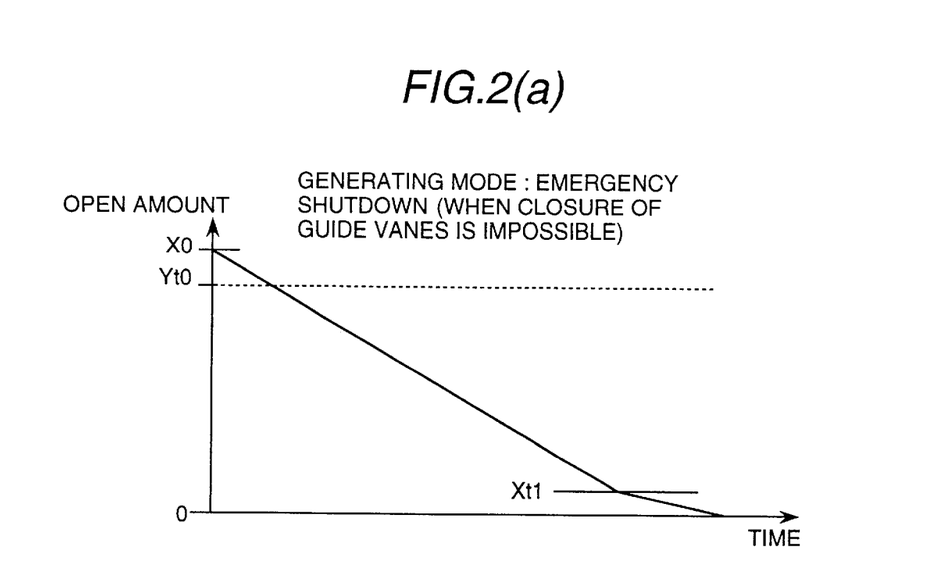
FIGS. 2(a) and 2(b) are drawings showing an inlet valve closure method of the present invention in the case where guide vane closure becomes impossible.
Figure 2B:
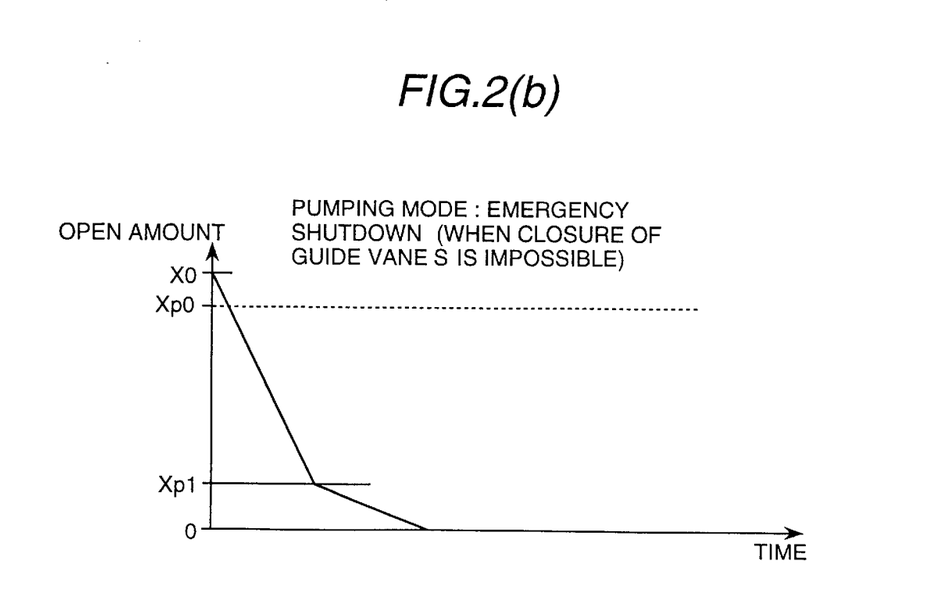

However, in adopting the closure patterns of the above described conventional technology as closely as possible, it will be understood that the inlet valve can not achieve the desired back-up function at the time of pumping mode emergency shutdown. That is, consider the case of FIGS. 2(a) and 2(b) where the guide vanes have failed and can not be closed at all.

This can be understood on the basis of an extent to which the inlet valve, can carry out the water flow reducing function in place of the guide vanes. The inlet valve is closed in the pump mode at the same slow closure rate as in the generating mode,and naturally reverse rotation can not be avoided more or less. A typical example of the relationship between the time required to fully close the inlet valve and the rotation speed at the time when the inlet valve is fully closed will be described using FIG. 4. It is assumed that the guide vane closure pattern is as shown by the solid line in FIG. 3(b) and the inlet valve closure pattern is as shown by the dotted line in FIG. 3(b). In such a case, if it is assumed that the guide vanes have failed, the rotation speed at the time the inlet valve is fully closed is lowered to Na' and does not lead to reverse rotation. However, As shown in FIG. 4, if the time required to fully close the inlet valve is further prolonged the rotation speed at the time the inlet valve is fully closed is lowered rapidly, and if the time required to fully close the inlet valve becomes longer than Tax, reverse rotation becomes a possibility. In the above described conventional art, for example, even if reverse rotation has been avoided, a large amount of reverse flow is possible transiently during positive rotation, as shown in FIG. 8(b), and clearly the reversible pump-turbine is exposed to a dangerous condition. On the other hand, If the closure rate of the inlet valve is increased, the inlet valve is allowed to play a part in substantially throttling discharge at the time of generating mode emergency shutdown, and depending on the situation when the operation point of the pump turbine enters the S-shaped characteristics there is a possibility of abnormal water hammer.

The object of the present invention is to provide a safe system that eliminates the drawbacks of the above described related art, and enables the back-up function of discharge adjustment by the inlet valve at the time of emergency shutdown in the pump mode, but on the other hand does not have any harmful effect in the generating mode.

DISCLOSURE OF THE INVENTION

The present invention provides a reversible pump-turbine system provided with an inlet valve and a discharge adjustment device for controlling adjustment of the discharge of the reversible pump-turbine which is connected to a generator-motor, and further comprises inlet valve closure means for closing the inlet valve at a rate slower than a normal closure rate of the discharge adjustment device at the time of pumping emergency shutdown, and the closure rate of the inlet valve is switched according to the operation mode of the reversible pump-turbine.

The present invention further provides automatic closure means for closing the inlet valve at a higher rate than the generating mode emergency shutdown, when a power supply to the generator-motor is disconnected or at the time of pumping mode emergency shutdown for carrying out a stop operation in a condition where the generator-motor power supply is lost.

Still further, in the present invention, at the time of pumping emergency shutdown for executing a stop operation accompanying disconnection of a drive power supply or in a power failure situation, the inlet valve is closed in a period of time longer than the time normally needed for the discharge adjustment device to substantially complete closure, and even when closure of the discharge adjustment device is impossible, inlet valve closure is carried out in a sufficiently short time period so that the rotation speed of the reversible pump-turbine at the time of closure of the inlet valve does not lead to reverse rotation.

The present invention further provides means for, at the time of pumping emergency shutdown, for executing a stop operation accompanying disconnection of a power supply of a drive electric motor or in a power failure situation, substantially completing inlet valve closure in a period of time longer than the time normal needed for the discharge adjustment device to substantially complete closure, and, when closure of the discharge adjustment device is impossible, even if reverse rotation of the reversible pump-turbine becomes temporarily allowed, closing the inlet valve at a speed sufficient to lower the opening area of the inlet valve at the instant of reverse rotation to an opening equivalent to or less than the opening of the discharge adjustment device required to start the pump turbine from standstill in the generation mode.

The present invention further completes inlet valve closure in a time period longer than a time period required for the discharge adjustment device to substantially complete closure in normal operation, at the time of generating mode emergency shutdown.

Still further, at the time of pumping emergency shutdown the present invention carries out inlet valve closure so as to constantly keep opening area of the inlet valve larger than the opening area of the discharge adjustment device all the way in normal operation, and besides, even if closure of the discharge adjustment device is impossible, inlet valve closure is carried out to an extent that does not lead to reverse rotation at the instant of completion of inlet valve closure.

Also, in the present invention, at the time of generating mode emergency shutdown accompanying disconnection of the output of the generator, inlet valve closure is executed so as to constantly keep the opening area of the inlet valve larger than the opening amount of the discharge adjustment device all the way in normal operation.

The present invention is further provided with a low speed detector for detecting that the rotation speed during pumping operation has fallen below a rated value (in the case of the adjustable speed machine, below an appropriate value according to the operating conditions at that time), and means for automatically switching so as to close the inlet valve at a high rate faster than that at the time of generating mode emergency shutdown, on condition that the low speed detector has operated.

The present invention is still further provided with a low speed detector for detecting that the rotation speed during pumping operation has fallen below a rated value (in the case of the adjustable speed machine, below an appropriate value according to the operating conditions at that time), and a failure detector for detecting that closing operation of the flow rate adjustment device such as the guide vanes have not been carried out at a specified rate, and has means for automatically switching so that the inlet valve is closed at a fast rate faster than the rate at the time of generating mode emergency shutdown on condition that the speed low detector and the failure detector have operated.

According to the present invention, by switching the closure rate of an inlet valve according to the operating mode, even if an abnormality arises in a discharge adjustment device, it is possible to achieve failsafe operation on the inlet valve side according to the operating mode at the time of the abnormality.

Further, according to the present invention, by slowing the inlet valve closure rate to less than that of a guide vane second restricted rate in the generating mode, abnormal water hammer is prevented even when the operation point of the pump turbine is tracing down the S-shaped characteristic, while a very fast closure rate enabling avoidance or reduction of reverse rotation and large reverse flow with positive rotation can be selected in the pumping mode.

Also, if the inlet valve is closed at the time of pumping emergency shutdown in a time period that is longer than the time the guide vanes take to close under normal closure, or if the inlet valve is closed so that inlet valve opening area is kept larger than the guide vane opening area all the way during normal closure, it becomes possible for the inlet valve to play a part in the failsafe operation while reducing or preventing the possibility of the inlet valve being used in substantial adjustment of discharge during normal operation of the guide vanes.

According to the present invention, even in the case of pumping emergency shutdown, if the inlet valve is closed at a sufficiently fast rate so that reverse rotation does not occur when the inlet valve is fully closed, it is possible to prevent reverse rotation after that.

Further, according to the present invention, at the time of pumping emergency shutdown, it is possible to limit actual damage to the machine by limiting the opening of the inlet valve at the instant of rotation reversal smaller than the opening of the guide vanes required for starting in the generating mode, even if reverse operation is unavoidable due to a failure of the discharge adjustment device.

For reduction of the discharge at the time of pumping mode emergency shutdown, there are three governing factors, that is, closing of the discharge adjustment device, closing of the inlet valve, and lowering of the rotation speed of the reversible pump-turbine itself, but of these factors, lowering of the rotation speed of the reversible pump-turbine itself is extremely significant. That is, even if the inlet valve is closed at a rapid closure rate, the extent to which it participates in throttling of discharge is not significant. Specifically, in this case, the object of the present invention can be achieved without exerting a large differential pressure on the inlet valve, i.e. without difficulty.

In other words it would be reasonable to carry out switching of the inlet valve for rapid closure only in the case where lowering of the rotation speed of the reversible pump-turbine itself predominantly affects throttling of discharge.

Also, a low speed detector can be used in place of direct detection of power failure conditions, where the motor input power is lost or disconnected during the pumping operation, since the speed immediately drops. Further, if a failure detector is provided to detect a closing failure of the discharge adjustment device not in accordance with the desired rate, it is possible to carry out inlet valve rapid closure only in the case where an AND condition is satisfied with respect to operation of the low speed detector and operation of the failure detector.

BEST MODE FOR CARRYING OUT THE INVENTION

The present invention will be described in more detail with reference to the attached drawings.

Figure 1A:
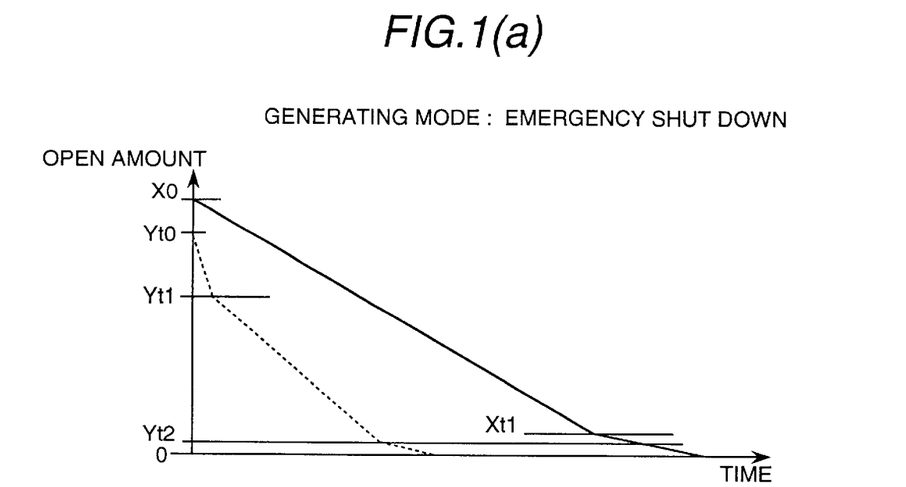
FIGS. 1(a) and 1(b) are drawings showing an inlet valve closure method of the present invention.
Figure 1B:
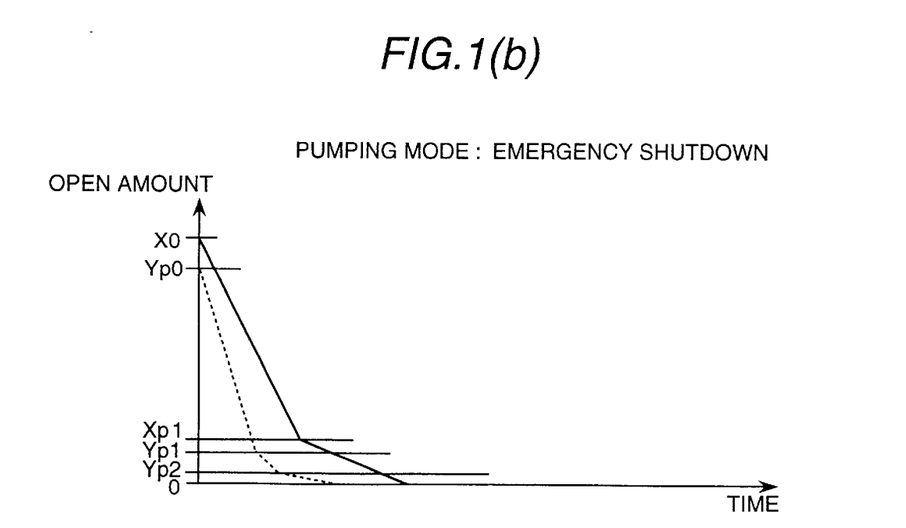

FIGS. 1(a) and (b) show an embodiment of the present invention. These drawings show the emergency shutdown conditions for a generating mode and a pumping mode, and in the drawings a dotted line represents guide vane opening amount while a solid line represents inlet valve opening amount. At the time of generating mode emergency shutdown, the inlet valve is closed at a rate that is slightly lower than a second restricted rate for the guide vanes. If the inlet valve is closed in this manner, it will be safe even if, guide vane closure becomes impossible. This is because it is possible to avoid abnormal water hammer even if the operating point of the reversible pump-turbine is tracing down the S-shaped characteristic. Since closure of the inlet valve is slow compared to the desired guide vane closure, the time period for which the rotation speed is high inevitably becomes longer, but it does not lead to damage of the reversible pump-turbine. Since, in the case of a reversible pump-turbine, raising of rotational speed is substantially limited by the existence of the S-shaped characteristic, it does not lead to an abnormal speed increase. Therefore, in a generating mode the back-up function of the inlet valve takes effect to realize failsafe operation. In the example of FIG. 1(a), a cushioning is provided to reduce closing speed of the inlet valve at the closed end below Xt1 but it is not necessary for the purpose of the present invention.

On the other hand, according to the reversible pump-turbine system of the present invention, at the time of pumping mode emergency shutdown, the inlet valve is closed at a faster rate than a second limit rate for the guide vanes in the above described generating mode up to the point where the opening amount is Xp1, as shown in FIG. 1(b). From opening amount Xp1, closure is automatically switched to a lower rate. This change in the closure rate is to prevent water hammer caused by sudden throttling of water already flowing through the pump turbine in the turbine direction as a result of flow reversal. With the slower closure rate of the related art, this change is not necessary. In the present invention, by carrying out control in this way, it becomes possible to maintain the rotation speed at the time of the inlet valve fully closed at a positive value including a desired margin, as shown by Na' in FIG. 4, or to prevent at least reverse rotation.

As another embodiment of the present invention, for example, when an abnormality arises in pumping operation mode, it is possible to prevent an undesirable condition that the pump turbine comes in a reverse flow operation before the inlet valve has been closed to a safe opening much smaller than Yb in FIG. 5. It is also possible to have completed closure of the inlet valve down to an opening amount equivalent to a guide vane opening setting for generating mode starting, before the rotation reversal.

If reverse rotation occurs with an opening amount larger than the above, operating conditions of the pump turbine become rough with large vibrations and noises. As a result, in the present invention, mechanical safety is ensured even when undesirable transfer to a substantial generating mode can not be avoided, as described above.

Figure 10:
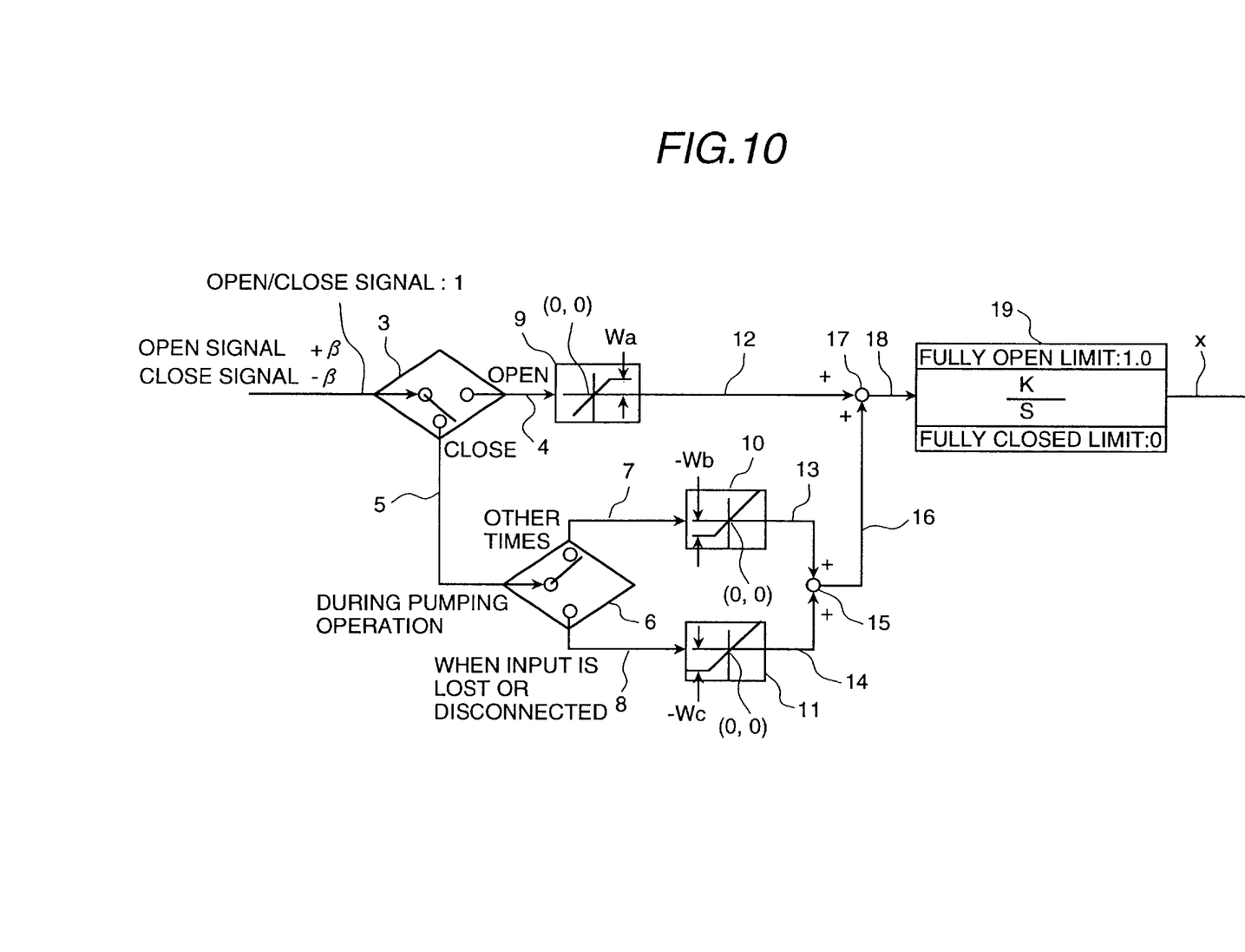
FIG. 10 shows an example of the specific circuit structure for carrying out the inlet valve closure method of the present invention.

FIG. 10 shows a hardware example for realizing the inlet valve closure method of the present invention. In this drawing, reference numeral 1 is an open or close signal to be supplied to a distributing valve for use with an inlet valve drive servo motor, and is +β(p.u.) for an open operation and −β(p.u.) for a close operation. Reference numeral 3 is an element for judging whether it is a close operation or an open operation, i.e. if a plunger of the distributing valve is moved up then an open side port is connected, while if the plunger is moved down a close side port is connected. Reference numeral 9 is an inlet valve opening speed setting element. Wa<β. Specifically, when an open operation command is inputted, the speed of movement of the inlet valve servo motor is limited to Wa.K(pu/sec). In other words, upward movement of the plunger of the distributing valve is mechanically limited, and/or an amount of oils passing through the open side port of the distributing valve is throttled.

Reference numeral 6 is a judging element for carrying out inlet valve rapid closure of the present invention limited to the case when input power during pumping operation is lost or disconnected. Normally, it is connected to the upper side and the closure rate is limited to Wb.K(p.u./sec) through a first closure rate limiting element 10. In the event that input power during pumping operation is lost or disconnected the judging element 6 is connected to the lower side and the closure rate is limited to Wc.K(p.u./sec) through the second closure rate limiting element 11.

What the above actually means is that downward movement of the distributing valve plunger is mechanically restricted, and/or an amount of oil passing through the close side port of the distributing valve is throttled in response to the previously described operating mode. Here, |Wb|<|β|, |Wc|<|β|.

Reference numeral 18 is the sum of outputs from three control elements 12, 13 and 14, but a selected control element is normally one from these three, and output from an element that is OFF is zero so no interference occurs among the three.

According to the present invention, an inlet valve performs a backup function for the guide vanes at the time of emergency shutdown, in both operating modes, namely in of generating and in pumping. At the time of generating mode emergency shutdown, abnormal water hammer arising due to a S-Shaped characteristic does not occur, even if closure of the guide vanes is not possible. Also, at the time of pumping mode emergency shutdown, even if closure of the guide vanes is not possible reverse rotation is not permitted or at least a large reverse discharge with positive rotation or reverse rotation under an excessively large opening is prevented, damage to the reversible pump-turbine and related devices is prevented and it is possible to maintain safety with minimum restriction.

What is claimed is:

1. A reversible pump-turbine system provided with an inlet valve and a discharge adjustment device for controlling adjustment of a discharge of a reversible pump-turbine connected to a generator-motor, comprising:
    inlet valve closure means for closing the inlet valve at a rate slower than a normal closure rate of the discharge adjustment device at the time of emergency shutdown, wherein
    the closure rate of the inlet valve is switched according to an operating mode of the reversible pump-turbine.

2. The reversible pump-turbine system as disclosed in claim 1, further comprising:
    automatic closure means for closing the inlet valve at a higher rate than generating mode emergency shutdown when a power supply to the generator-motor is disconnected or at the time of pumping mode emergency shutdown for carrying out a stop operation in a condition where the generator-motor power supply is lost.

3. The reversible pump-turbine system as disclosed in claim 2, wherein
    at the time of pumping emergency shutdown, means are provided for executing a stop operation accompanying disconnection of a power supply of a drive power supply or in a power failure situation, for carrying out inlet valve closure in a period of time longer than the time normally needed for the discharge adjustment device to substantially complete closure, and
    when closure of the discharge adjustment device is impossible, for carrying out inlet valve closure in a time period in which rotation speed of the reversible pump-turbine at the time of closure of the inlet valve has not be reversed.

4. The reversible pump-turbine system as disclosed in claim 2, wherein,
    at the time of pumping emergency shutdown, means are provided for executing a stop operation accompanying disconnection of a power supply of generator-motor or in a generator-motor power supply failure situation, for substantially completing inlet valve closure in a period of time longer than a time needed for the discharge adjustment device in normal condition to substantially complete closure, and
    when closure of the discharge adjustment device is impossible, for closing the inlet valve at a speed sufficient to lower the opening area of the inlet valve at the time when reverse rotation occurs to a set opening amount, or less, of the discharge adjustment device at the time of generation mode starting.

5. The reversible pump-turbine system as disclosed in claim 3, wherein
    at the time of generating mode emergency shutdown, means are provided for carrying out inlet valve closure in a time period longer than a time period required for the discharge adjustment device in normal condition to substantially complete closure.

6. The reversible pump-turbine system as disclosed in claim 2, wherein,
    at the time of pumping emergency shutdown, means are provided for carrying out inlet valve closure so as to keep the opening area of the inlet valve larger than the opening area of the discharge adjustment device closing in normal condition, and if closure of the discharge adjustment device becomes impossible, inlet valve closure is carried out at such a rate that does not lead to reverse rotation of the reversible pump turbine before completion of closure.

7. The reversible pump-turbine system as disclosed in claim 3, wherein, at the time of generating mode emergency shutdown accompanying disconnection of output of the generator-motor, means are provided for execution of inlet valve closure so as to keep an opening area of the inlet valve larger than an opening area of the discharge adjustment device closing in normal condition.

8. A reversible pump-turbine system provided with an inlet valve and a discharge adjustment device for controlling adjustment of a discharge of a reversible pump-turbine connected to a generator-motor, comprising:

inlet valve closure means for closing the inlet valve at a rate slower than a normal closure rate of the discharge adjustment device at the time of emergency shutdown, wherein the closure rate of the inlet valve is switched according to an operating mode of the reversible pump-turbine; and further comprising:

a low speed detector for detecting that rotation speed during pumping operation has fallen below a rated value; and closure means for closing the inlet valve at a high rate faster than the closure rate at the time of generating mode emergency shutdown, in response to a signal from the low speed detector.

9. A reversible pump-turbine system provided with an inlet valve and a discharge adjustment device for controlling adjustment of a discharge of a reversible pump-turbine connected to a generator-motor, comprising:

inlet valve closure means for closing the inlet valve at a rate slower than a normal closure rate of the discharge adjustment device at the time of emergency shutdown, wherein the closure rate of the inlet valve is switched according to an operating mode of the reversible pump-turbine; and further comprising:

a low speed detector for detecting that the rotation speed during pumping operation has fallen below a rated value, a failure detector for detecting that a closing operation of the discharge adjustment device has not been carried out at a specified rate; and closure means for closing the inlet valve at a fast rate faster than the rate at the time of generating mode emergency shutdown in response to operation of the low speed detector and the failure detector.

10. A reversible pump-turbine system provided with an inlet valve and a discharge adjustment device for controlling adjustment of a discharge of a reversible pump-turbine connected to a generator-motor, comprising:

a controller for closing the inlet valve at a rate slower than a normal closure rate of the discharge adjustment device at the time of emergency shutdown, wherein the closure rate of the inlet valve is switched according to an operating mode of the reversible pump-turbine.

11. The reversible pump-turbine system as disclosed in claim 10, further comprising:

a controller for closing the inlet valve at a higher rate than generating mode emergency shutdown when a power supply to the generator-motor is disconnected or at the time of pumping mode emergency shutdown for carrying out a stop operation in a condition where the generator-motor power supply is lost.

12. In a reversible pump-turbine system provided with an inlet valve and a discharge adjustment device, a method of controlling adjustment of a discharge of a reversible pump-turbine connected to a generator-motor, comprising the steps of:

closing the inlet valve at a rate slower than a normal closure rate of the discharge adjustment device at the time of emergency shutdown, wherein the closure rate of the inlet valve is switched according to an operating mode of the reversible pump-turbine.

13. The method of claim 12, further comprising the steps of:

closing the inlet valve at a higher rate than generating mode emergency shutdown when a power supply to the generator-motor is disconnected or at the time of pumping mode emergency shutdown for carrying out a stop operation in a condition where the generator-motor power supply is lost.

14. The method of claim 13 further comprising the steps of, at the time of pumping emergency shutdown, executing a stop operation accompanying disconnection of a power supply of a drive power supply or in a power failure situation, carrying out inlet valve closure in a period of time longer than the time normally needed for the discharge adjustment device to substantially complete closure, and when closure of the discharge adjustment device is impossible, carrying out inlet valve closure in a time period in which rotation speed of the reversible pump-turbine at the time of closure of the inlet valve has not be reversed.

15. The method of claim 13 further comprising the steps of, at the time of pumping emergency shutdown, executing a stop operation accompanying disconnection of a power supply of generator-motor or in a generator-motor power supply failure situation, substantially completing inlet valve closure in a period of time longer than a time needed for the discharge adjustment device in normal condition to substantially complete closure, and when closure of the discharge adjustment device is impossible, closing the inlet valve at a speed sufficient to lower the opening area of the inlet valve at the time when reverse rotation occurs to a set opening amount, or less, of the discharge adjustment device at the time of generation mode starting.

16. The method of claim 14 further comprising the step of, at the time of generating mode emergency shutdown, carrying out inlet valve closure in a time period longer than a time period required for the discharge adjustment device in normal condition to substantially complete closure.

17. The method of claim 13 further comprising the step of, at the time of pumping emergency shutdown, carrying out inlet valve closure so as to keep the opening area of the inlet valve larger than the opening area of the discharge adjustment device closing in normal condition, and if closure of the discharge adjustment device becomes impossible, carrying out inlet valve closure at such a rate that does not lead to reverse rotation of the reversible pump turbine before completion of closure.

18. The method of claim 14 further comprising the step of, at the time of generating mode emergency shutdown accompanying disconnection of output of the generator-motor, executing inlet valve closure so as to keep an opening area of the inlet valve larger than an opening area of the discharge adjustment device closing in normal condition.

* * * * *